United States Patent [19]

Everett, Jr.

[11] 4,005,931
[45] Feb. 1, 1977

[54] SEALED CASSETTE FOR OPTICAL SOUND PROJECTION

[75] Inventor: Seth Leroy Everett, Jr., Lincroft, N.J.

[73] Assignee: The United States of America as represented by the Secretary of the Army, Washington, D.C.

[22] Filed: Jan. 15, 1974

[21] Appl. No.: 433,590

[52] U.S. Cl. .............................. 352/78 R; 352/29
[51] Int. Cl.² ...................................... G03B 23/06
[58] Field of Search ................ 352/27, 29, 221, 72, 352/75, 78 R, 78 C

[56] References Cited

UNITED STATES PATENTS

| | | | |
|---|---|---|---|
| 2,226,363 | 12/1940 | Williams | 352/72 |
| 3,025,750 | 3/1962 | Polan et al. | 352/72 |
| 3,268,287 | 8/1966 | Nemeth | 352/187 |
| 3,375,054 | 3/1968 | Hughes | 352/29 |
| 3,402,982 | 9/1968 | Lemelson | 352/27 |
| 3,410,498 | 11/1968 | Winkler et al. | 352/78 R |
| 3,537,779 | 11/1970 | Horvath | 352/78 |
| 3,600,070 | 8/1971 | Downey | 352/72 |
| 3,601,335 | 8/1971 | Dopkins et al. | 352/72 X |
| 3,687,531 | 8/1972 | Bogdanowicz | 352/126 X |
| 3,692,956 | 11/1970 | Northrup | 242/198 |
| 3,746,438 | 7/1973 | Misawa et al. | 352/29 X |
| 3,840,973 | 10/1974 | Potter | 352/72 |
| 3,876,296 | 4/1975 | Custer | 352/27 |

Primary Examiner—L. T. Hix
Assistant Examiner—Alan Mathews
Attorney, Agent, or Firm—Nathan Edelberg; Sheldon Kanars; Daniel Sharp

[57] ABSTRACT

A film projector system including a sealed film cassette removably mounted within an aperture in the projector and driving means in said projector mechanically engaging coupling means extending through said cassette for driving the sealed film between hubs sealed in said cassette intermittently past a film projection location gate in said cassette and continuously past a sound detection location therein, with the projection plane of the film at said projector locations being disposed normal to the projector optical projection optical sound beams and twisted ninety degrees with respect to the plane of that portion of the film wound on said hubs so that the projector beams do not pass between the film hubs. The coupling means extending through seals in the periphery of said cassette are biased in contact with similar coupling means associated with the projector driving means by pressure exerted upon said cassette by a cassette cover hinged to, and latched with, the projector body, and by springs mounted on the cassette cover and at the periphery of said projector aperture. The driving means can consist of stepping motor means supplied selectively with the proper type of electronic pulse input to effect intermittent film advance or continuous film movement at more than one speed in either the forward or reverse direction.

3 Claims, 15 Drawing Figures

SEALED CASSETTE FOR OPTICAL SOUND PROJECTION

BACKGROUND OF THE INVENTION

Motion picture projectors, with or without accompanying sound, have been used for many years; such projectors have used two exposed hubs, often with both hubs actually located external to projector body. In some cases, a non-sealed casette has been disposed outside the projector body and an exposed take-up hub located within the non-sealed projector body. In either case, the exposed film must be threaded through the optical projecting system and the leading end affixed to the take-up hub.

In certain applications, it is desirable to provide a miniaturized, rugged projection system which not only is simple to operate, but also capable of operation, storage and transport in almost any climatic condition to be encountered throughout the world. These objectives can be met by using a completely sealed film cassette which can be inserted rapidly into, or removed readily from, the projector and by mounted the casette within the projector in such a manner that the film is moved within the sealed cassette by drive means within the projector which is external to the film cassette.

The projector has a relatively narrow hinged and latchable cassette cover which can be opened to provide a narrow access opening in which to insert the sealed film casette. The cassette can be readily, simply, and accurately positioned with the projector by placing its alignment key into an alignment key slot in the projector. The keyed cassette cover then is pressed against the partially inserted cassette until the cover latch engages a latch on the projector body. There are driven connectors in the projector which interface mechanically with the cassette film control driving means for the film rewind and take-up hubs, and with the intermittent and continuous film drive sprocket wheels. This interface is accomplished by rotatable connectors which extend through seals in the periphery of the film cassette and are biased in engagement with the driven connectors in the projector by the latching of the hinged cover of the projector to the projector body, in conjunction with the pressure exerted on the aforesaid engaging connectors by leaf springs in the cover along one edge of the aforesaid access opening.

In prior film projectors, the optical projecting beam(s) which is directed through the film normally passes between the two film hubs with the axis of the beam(s) lying substantially in a plane passing through the two hubs. With such an arrangement, it can be shown that the overall space required to receive the film reels on two such hubs must be four times the radius R of a fully wound reel of film. In addition, a considerable space of width d must be provided between the points of maximum excursion of film on each film reel to permit uninterrupted passage, at all times, of the optical projection and optical sound extraction beams through the reels of film. In summary, a minimum width of $4R + d$ would be required. It is important that the space occupied by the reels of film and the optical projection equipment be kept to a minimum. In accordance with the invention, the film is twisted through ninety degrees in the region of the two optical projection beams in order to obviate the need for projecting the optical beams between the reels of film. Also, in accordance with the invention, the film after being removed from the rewind hub onto the take-up hub, subsequently can be driven in the reverse direction back onto the rewind hub. In this manner, the maximum spacing between the two hubs is substantially equal to the radius R of a completely full reel of film, as contrasted with a spacing $= 2R + d$ for the conventional projector. Since the maximum excursion of periphery of the full reels of film from the empty hub is equal to the radius of a full reel of film, it is obvious that the minimum cassette width needed to just accommodate the film in the projection system of the invention is approximately $3R$, as contrasted with $4R + d$ for the usual film projection systems of the prior art. If one were, for the sake of argument only, to attempt to operate the projector system of the invention without the aforesaid ninety degree twist in the film, it would be essential to introduce a group of mirrors within the sealed cassette; this would complicate construction of the film cassette and alignment of the cassette within the projector and would require undue enlargement of the cassette in order to accommodate the mirrors.

Certain other advantages of the projection system design of the invention can be summarized as follows:

The film remains completely enclosed in the sealed film cassette during transport, presentation, and storage, and is never directly exposed to harmful environmental conditions such as dirt, dust, moisture and the like. The projector mechanism does not physically contact the film at any time. Because of this fact, and because the operator cannot accidentally touch, jar, jam, scratch, or otherwise mutilate the film, film image quality and film sound quality can be maintained reliably at a high level for a long time. The usable life of the film also can be increased because special lubricants can be sealed along with the film in the cassette under controlled conditions in the manufacturer's plant or in the laboratory.

The projector is extremely simple to operate since the operator does not come into direct contact with the film. Moreover, no delicate film threading or film-gate or aperture cleaning operations are required.

The projector design permits the film cassette to be changed rapidly--in less than 10 seconds. The projection cassette design inherently permits fast forward and reverse winding of the film, in addition to offering the capability of operating at all standard film projection speeds.

Since each film cassettte inherently contains its own film take-up and rewind hubs, immediate rewinding of the film need not be done in the case of a multi-reel presentation, but can be done at the conclusion thereof; this is an important factor where multi-reel presentations are required and only a single projection device is available.

An intermittent film advance movement is needed to move the motion picture film through the film projector gate of the projector. Each film image frame must be moved rapidly into the projection gate position and then held steadily for projection in that position for a discrete time interval. The cycle is repeated by rapidly advancing the next film image into position. Current intermittent film advance mechanisms used in projection equipment normally use either a mechanical claw or a "Maltese cross" type of movement. All of these movements are essentially mechanical cam and pin systems which require a minimum of two moving parts with considerable dynamic mechanical contact and interaction therebetween. High speed intermittent movement, as now used on projectors, would cause damage to the film by placing reverse stress in the film perforations and would rip the film stock. Moreover, mechanical wear of such conventional intermittent movements at high speed would be excessive. In accordance with the invention, the desired film advance intermittent movement is obtained by simple electronic control of a stepping motor. Each incremental stepwise rotation is accomplished by applying an electronic pulse to said motor. In the case of sound film, the film must be driven in continuous fashion at relatively constant speed past the sound extraction beam location of the projector. The use of low voltage stepper motors provide incremental rotary response to thousands of pulses per second. The stepping motor can be advanced by a symmetrical train of such electronic pulses to provide relatively high speed continuous film movement. A full range of pulse rates can be obtained readily by miniaturized electronic circuitry to provide any number of desired continuous operating speeds. The stepping motor allows for both intermittent and continuous motion in the forward or reverse direction and allows for safe, high speed movement of the film through the projector. In this way, rapid access to any portion of a lengthy film reel can be had. The overall reliability of the projector is increased by use of the stepping motor, since no dynamic interaction of mechanical parts is required, as in the case of conventional pin and cam type projector movements. A reduction of parts, as well as spare parts inventory for projectors is possible, since one type of stepping motor can be used to provide the film advance function and the rewind function. Moreover, the electrically controlled stepping motor can operate from low voltage battery supplies.

BRIEF DESCRIPTION OF DRAWINGS

FIG. 11 is a diagram illustrating typical pulse waveforms suitable for application for stepping drive motors.

DETAILED DESCRIPTION OF INVENTION

The projector 10 and the details thereof are illustrated in FIGS. 1 to 4. A film cassette 100, which is illustrated in varying detail in FIGS. 5 to 9 and described in detail subsequently, is held in position within the projector body 12 by a projector cassette cover 25. The latter is secured in the closed position by the cover latch 27 which includes engaging members 27a and 27b affixed, respectively, to the cassette cover 25 and to the projector body 12. As indicated more clearly in FIG. 3, the cassette cover 25 may be unlatched and pivoted about the hinge 28 to a position allowing either for insertion of the sealed cassette 100 into the projector body 12, or removal of the sealed cassette from the projector body, as desired. As indicated schematically in FIG. 2, the projector body 12 houses the light and sound optical systems, including the projection optics 29, a portion of which also appears in FIG. 1. The projector main optical system includes a projection lamp 31 with accompanying reflector 32, a condensing lens system 33, a shutter 34, and the projection optics 29. The film image projector beam is indicated by the long-dashed arrow 35. Interposed between the condensing lens system 33 and the projection optics 29 is the film cassette 100 which fits within an appropriate recess in the projector body 12, as will be shown later. The optical sound system includes an exciter lamp 36, focusing lens 37 and a detector 38 which receives the light beam, indicated by the dot-dashed arrow 40 in FIG. 2, that passes through the film and converts the light energy into an electrical signal corresponding to the film scene; this electrical signal can be amplified by amplifier 41 and supplied to a speaker 42. The plane of the film in the region penetrated by the two light beams is indicated by the short-dashed line 43 in FIG. 2. The projector body 12 further contains the various film drive means and controls to be described in detail later.

Figure 1:
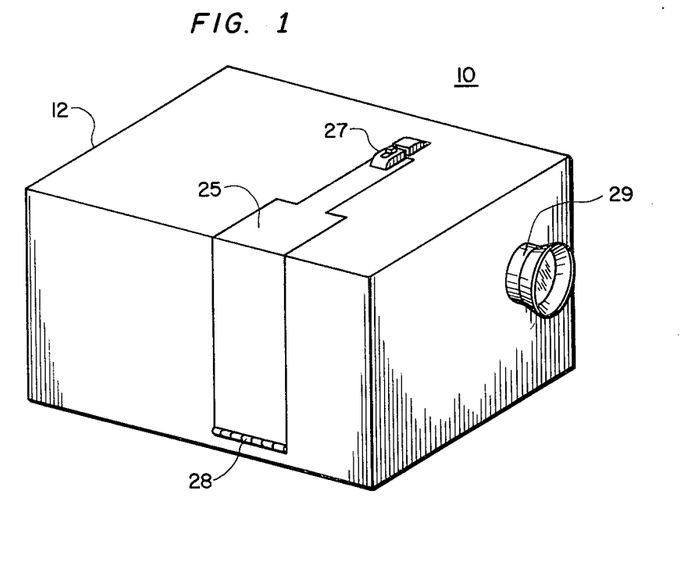
FIG. 1 is a general pictorial view of a film projector with a hinged and latched cover for a film cassette.
Figure 2:
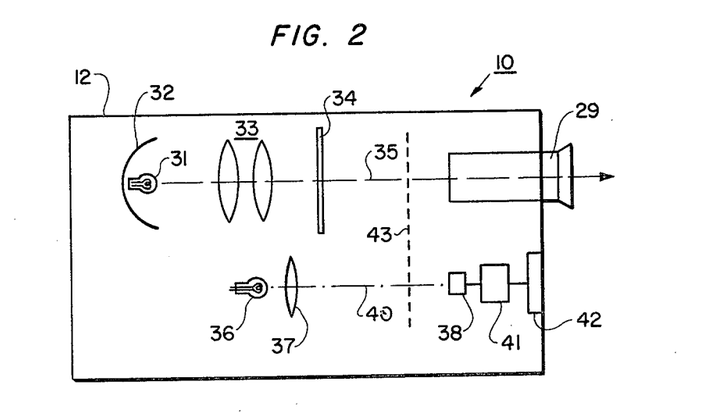
FIG. 2 is a schematic view showing the relationship between the two projector optical beams and between the projector optics and the film cassette.
Figure 3:
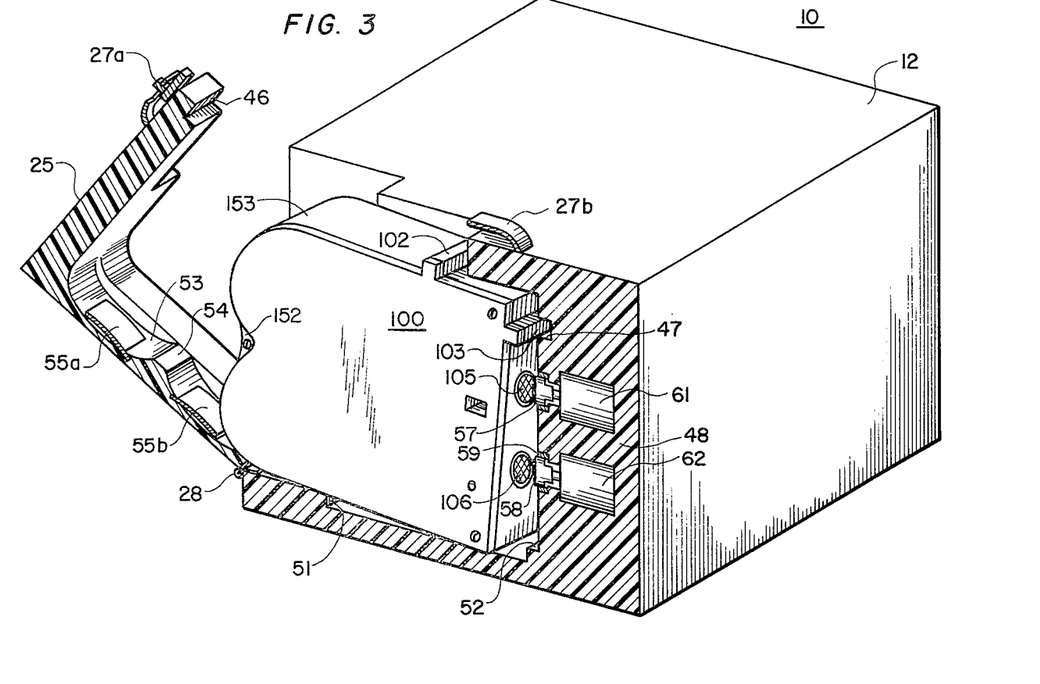
FIG. 3 is a view, partially in section, illustrating details of the film cassette cover and showing the way in which the film cassette is inserted into and held in proper alignment within the projector.

The manner of positioning the sealed film cassette 100 into the projector 10 is best shown in FIG. 3, which, for the sake of clarity, shows only half of the projector cassette cover 25. The film cassette 100 contains alignment keys 102 and 103 which engage, respectively, the alignment slot 46 in cassette cover 25 and alignment slot 47 in the wall 48 of the projector body 12. The bottom surface of cassette 100 rests on the step portions 51 and 52 of the projector body. The projector cassette cover 25 has a doubly curved interior surface 53 with a central projecting portion 54 adapted to fit within a corresponding central slot 152 in the doubly curved periphery 153 of cassette 100. A first pair of leaf springs 55a and 55b, a portion of which are visible in FIG. 3, serve to maintain the mechanical coupling elements 105 and 106 of the film cassette 100 in close contact, respectively, with the intermittent film drive connector 57 and the continuous film drive connector 58. The drive connectors 57 and 58 are rotatably mounted in bearings 59 affixed to the wall 48. The drive connectors 57 and 58, in turn, are mechanically coupled to the respective film drive motors 61 and 62. These motors may be disposed in recesses found within the back wall 48 of the projector body 12, or encapsulated within the back wall 48. The exposed face of film drive connectors 57 and 58 can be roughened, as indicated in FIGS. 3 and 4, to increase the frictional coupling between the film drive connectors and the mating mechanical connectors 105 and 106 which are connected to sprocket wheels in the film cassette 100.

Figure 4:
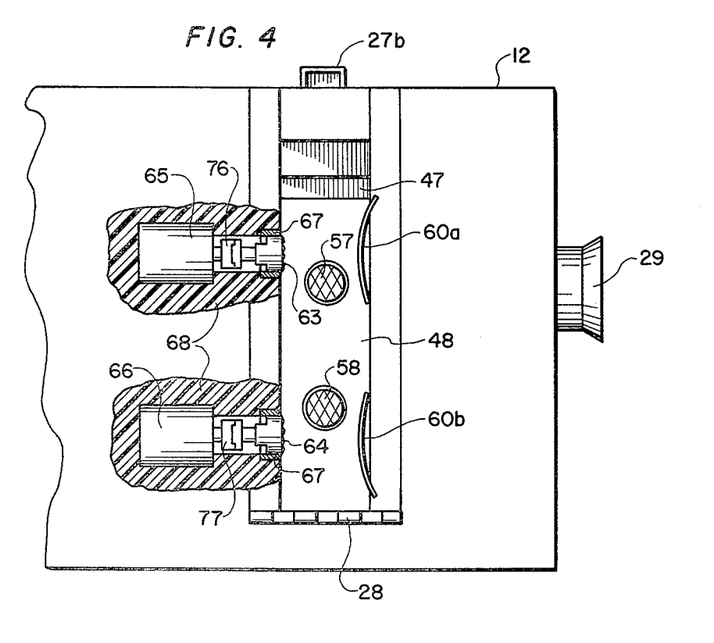
FIG. 4 is a view showing the aperture in the projector within which the film cassette is inserted, together with certain drive means and connections.

A second pair of leaf springs 60a and 60b, visible in FIG. 4, maintain the mechanical coupling elements of the film cassette 100 in firm contact with the drive connectors 63 and 64 for the respective film drive motors 65 and 66. One of the coupling elements, viz., element 107 is visible in FIGS. 6 and 7; the coupling element associated with the take-up hub 112 and meshing the coupling element 64 in projector 10 is not visible in the drawings. The drive connectors 63 and 64 are rotatably mounted in bearings 67 in the supporting medium 68 of the projector body 12, as shown in FIGS. 4 and 7; the drive motors 65 and 66 are mounted to, or encapsulated within, the supporting medium 48 which forms a portion of the projector body 12 lying outside the two optical beam paths shown in FIGS. 2 and 5.

Figure 5:
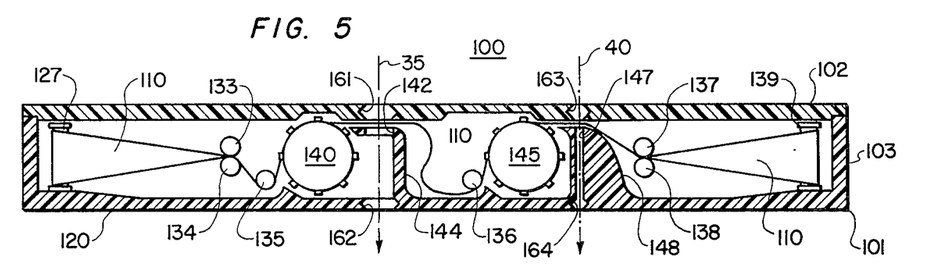
FIG. 5 is a traverse view of a film cassette, showing the manner in which the film is transported across the projection locations and twisted on either side of said locations.
Figure 6:
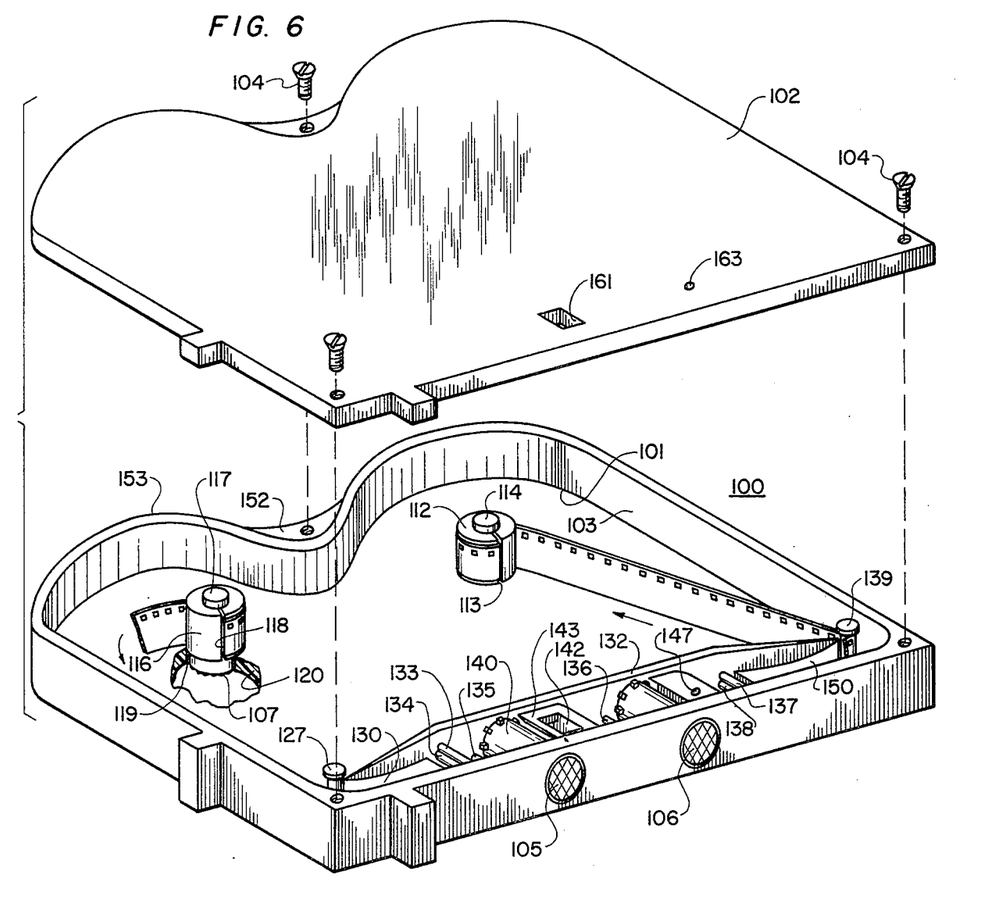
FIG. 6 is a pictorial view of the film cassette illustrating pertinent interior construction.
Figure 7:
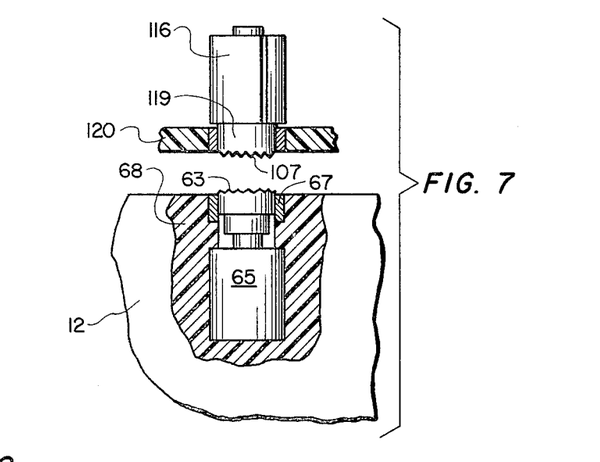
FIG. 7 is a detail view showing the relationship between the driving means in the projector and a driven film hub in the film cassette.

Further details of the sealed film cassette 100 for film 110 is shown in FIGS. 5 to 9. The cassette 100 comprises a cassette body 101 and a cover plate 102; the latter is secured to the peripheral wall 103 of the main body 101 by screws 104. A gasket seal may be used between the cover plate 102 and the cassette body 101 when screws are used, or the cover plate 102 may be fused to the peripheral wall 103 once the film has been inserted. A film take-up hub 112 provides capability to take up the projected film and includes a film leader 113 which is permanently affixed to hub 112, as by insertion of the leader within a slot in hub (see FIG. 6) and by initially driving a wedge pin 114 into the aperture within the tubular hub 112. The film received hub 116 includes a wedge 117 for permanently affixing the film trailer 118 to film rewind hub 116. The two hubs 112 and 116 rotate on bearings 119 in the base plate 120, and are separately driven by respective drive motors 65 and 66 through a corresponding mechanical clutch including two engaging clutch plates. The clutch plate 107 is attached to the hub 116 as shown in FIGS. 6 and 7 and engages the clutch plate 63 attached to drive motor 65. See FIG. 7. Similarly, a clutch plate, not visible in FIGS. 6 and 7, but connected to take-up hub 112 engages the clutch plate 64 connected to drive motor 66. See FIG. 7. The bearing areas of the two hubs are appropriately sealed to prevent entrance into the cassette 100 of moisture, dust and other foreign substances.

Further details of operation of the various driving motors will be given subsequently after explaining certain structural means along which the film is transported.

Figures 8, 9:
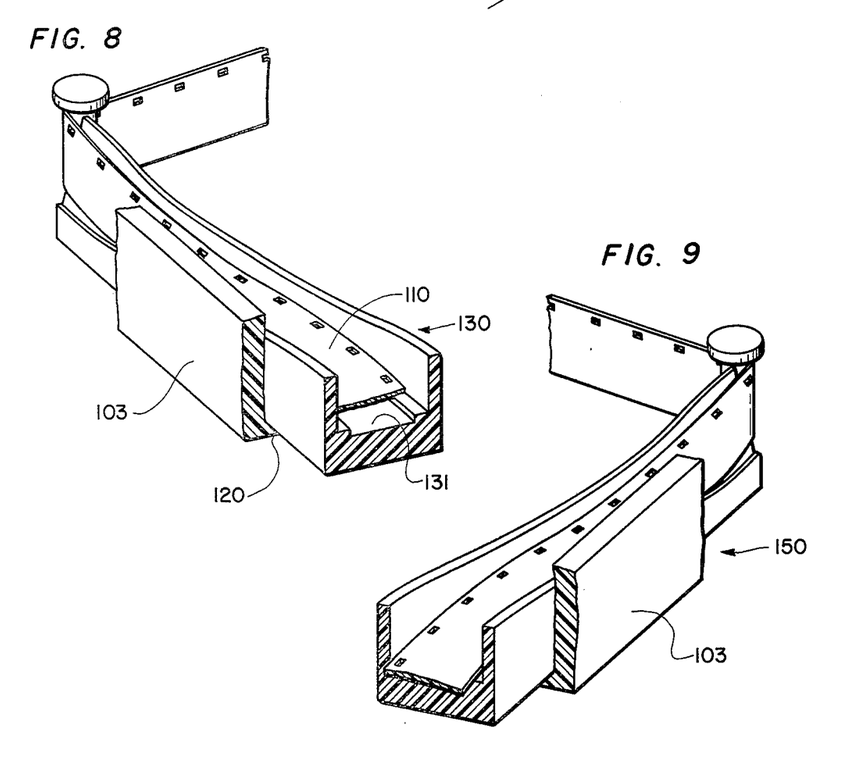
FIGS. 8 and 9 are detail views showing the construction of the two film twisting means in the film cassette.

The film 110 must be oriented so that, as it passes the projected film frame location (film projection gate) and sound take-off location (optical sound projection gate), the plane of the film is normal to the film projector light beam and sound exciter light beam. The orientation of the film will be referred to as the projection orientation of the film. The projection orientation of the film is shown schematically in FIG. 2. The film 110, a portion of which is shown in both FIGS. 5 and 6, travels from left to right and emerges from the film rewind hub 116 with the film plane oriented 90 degrees with respect to said projection orientation. Film 110, after passing around film guide post 127, undergoes a 90 degree twist, accomplished by feeding the film through the molded film trough 130, visible in FIG. 6 and shown in detail in FIG. 8. One end of the twisted film trough 130 either is formed integral with, or very closely spaced from the film guide post 127. The other end of twisted trough 130 lies in a plane perpendicular to both of the aforesaid optical axes 35 and 40. The trough 130 can be molded as an integral extension of the peripheral wall 103 of the cassette body 101, or, as shown in FIG. 8, it may be a separate trough sealed on the base plate 120 of the cassette base section contiguous with the aforesaid wall 103. As indicated in FIG. 8, the trough 130 can have a recess 131 formed therein to prevent scratching or other damage to the film as it passes along the trough. The film 100, after emerging from the rewind hub 116 and being routed around guide post 127, is twisted gradually through 90 degrees and, upon emerging from the trough 130, attains the desired projection orientation. The film then passes between a pair of film guide posts 133 and 134. These guide posts, like the guide posts 127, 135, 136, 137, 138 and 139, may be fixed or roller type guide posts. The guide posts 133 to 138, for example, may fit into aligned receiving apertures, not visible in FIG. 6, in the peripheral cassette wall 103 and the interior wall 132, in a manner similar to that in which spring-loaded wrist-watch strop pins fit into a wrist-watch case. The film, after passing through guide posts 133 and 134, passes around guide post 135 and over the intermittent drive film advance sprocket wheel 140. The sprocket wheel 140 is driven intermittently through clutch plates 105 and 57 by drive motor 61 located in the projector 10 past the projection frame aperture 142 formed within the lip portion 143 of flange 144; the latter can be either integral with the cassette body 101, as indicated in FIG. 5, or a separate element attached to the base plate 120. The film 110 then passes under guide post 136, over a continuous drive film advance sprocket wheel 145, thence past the optical sound system detection aperture 147 (see FIG. 6) formed within a solid flange 148 which, as in the case of flange 144, may be integral with the cassette body 101 or a separate element secured to base plate 120. In practice, the flanges 144 and 148 may be part of a complete molded cassette body 101. The film next passes between film guide posts 137 and 138 and passes over a molded trough 150 which is shown in detail in FIG. 9. The comments made in connection with the trough 130 are equally applicable to trough 150, except, of course, that the direction of the 90° twist in trough 150, and hence, of the film traversing it, is opposite to that for the trough 130. The plane of the film, after emerging from trough 150, is oriented in the same plane as when entering the trough 130. After emerging from trough 150, the film passes around film guide 139 and is wound onto the take-up hub 112 which is driven by motor 66 located in projector 10. At the projected frame aperture location, a glass window 161 is mounted within an aperture cover plate 102 and a glass window 162 similarly mounted at the sound take-off aperture in the base plate 120. At the optical sound exciter location, a glass window 164 is mounted within an aperture in cover plate 102 and a glass window 166 is mounted in alignment with window 164 within an aperture in base plate 120. The windows 160 to 164, are appropriately sealed to prevent entrance of dust, moisture and the like into the interior of cassette 100. As indicated in FIG. 5, the projection frame light beam 35 see also FIG. 2) passes through the aligned window 161, aperture 142 and window 162; similarly, the sound take-off optical beam 40 passes through aligned window 163, aperture and window 164.

Intermittent frame advance motion is provided by the intermittent drive sproket wheel 140 which is located close to the frame gate (projection aperture) to insure accurate film movement and maintenance of the film flate in a plane normal to the direction of the optical beams 35 and 40. Each film image frame must be rapidly moved into the projection gate position and held fixed in that position for a discrete time interval. The single frame change must occur in the time increment when the shutter 34 is blocking light from the projection lamp 31 (see FIG. 2). For conventional sound projection operation, the film frames are advanced at 24 frames per second and a two-blade shutter is used to block the projection lamp twice during each frame interval - once for frame position charge, and again to increase the flicker rate of the projected image. As the off-on shutter intervals are equal in time, the interval available for frame change in one quarter of the 1/24 second frame duration, or 1/96 second. The film must be advanced one frame (one incremental step) in 1/96 second, then held fixed for 3/96 = 1/32 second for projection of the frame before advancing to the next frame.

In order to provide intermittent film advance past the film projection gate, the intermittent drive sprocket wheel 140 is driven intermittently by projector motor 61. This motor may be a stepping motor to which an electronic pulse can be applied to perform each incremental angular stepped rotation. The relationship between the stepping increment angel O, the arc length S along the periphery of a sprocket wheel of diameter D and having 24 sprockets is $$D = 2 \frac{S}{\theta}$$

where O is expressed in radians and D and S in inches. Assuming a desired stepping increment angle O of 15° for moving the film by one frame (the value of O considered to be most favorable in minimizing mechanical motion required by the motor for each frame advance) a sprocket arc length S = 0.166 inches (corresponding to the perforation pitch for Super 8 film), the diameter D of a 24 sprocket wheel necessary to provide for an advancement of exactly one frame of Super 8 film for each incremental 15° step of the motor would be $$\frac{2 (0.166)}{0.262} = 1.27 \text{ inches.}$$

Summarizing, the operation sequence of a projection device using the stepping motor film advance mechanism, as the shutter blocks light from entering the film image projector gate, the stepping motor 61 is electronically pulsed causing it to rotate the film advance sprocket wheel 140 one increment, and thereby the film by one frame, the shutter opens permitting the next frame — which is now in the projection frame gate — to be projected, and finally, the shutter is used to block (chop) the light through this projected film image frame either once or twice, as explained above. This sequence is repeated for subsequent frames.

As each frame of the film is advanced, the film passes into a film loop region lying roughly between the flange 144 and the film guide post 136. Some portion of the film always remains in this region prior to being advanced by the continuously driven sprocket wheel 145 at constant speed past the optical sound detection gate location. It is necessary, of course, to move the film past this optical sound readout location at a constant speed in order to achieve accurate sound reproduction. The motor 62 used to continuously drive sprocket wheel 145 can be a low voltage stepper motor which can be advanced by a symmetrical series of electronic pulses to provide smooth and continuous high speed movement of the film past the optical sound detection location without damage to the film perforations, which would be inherent in a high speed intermittent movement used on current film projection equipment. Safe, high speed film movement, attainable with the stepping motor, permits rapid access to any portion of a film reel presentation in either the forward or reverse direction. Complete rewind of the film back onto the rewind hub 116 at the end of the film presentation can be accomplished without any film handling or any mechanical changes on the part of the operator.

In the device shown in FIGS. 3 to 6, separate motors 65 and 66 are used for driving the rewind hub 116 and take-up hub 112, respectively, about which the film is wound. With this arrangement, the motors 65 and 66 would be driven continuously at a speed equal to that of the motor 62.

Alternatively, the hubs 112 and 116 could be driven from motor 62 by belts or other drive means, not shown. With such an arrangement, the motors 65 and 66 would be dispensed with.

Figure 10:
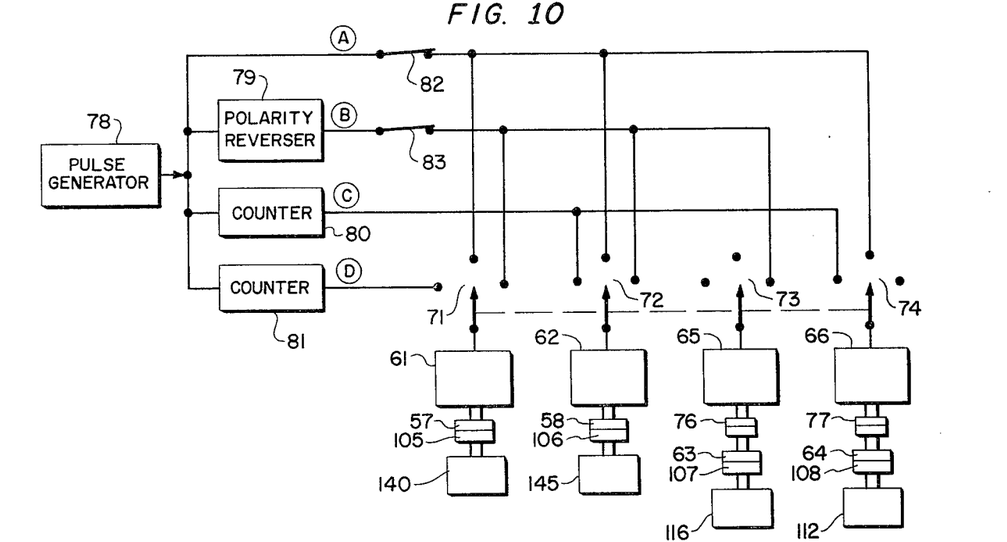
FIG. 10 is an electrical diagram of a projector drive system illustrating the manner in which the various projector drive motors are coupled to the driven means of the film cassette for various operating modes.
Figures 11A, 12:
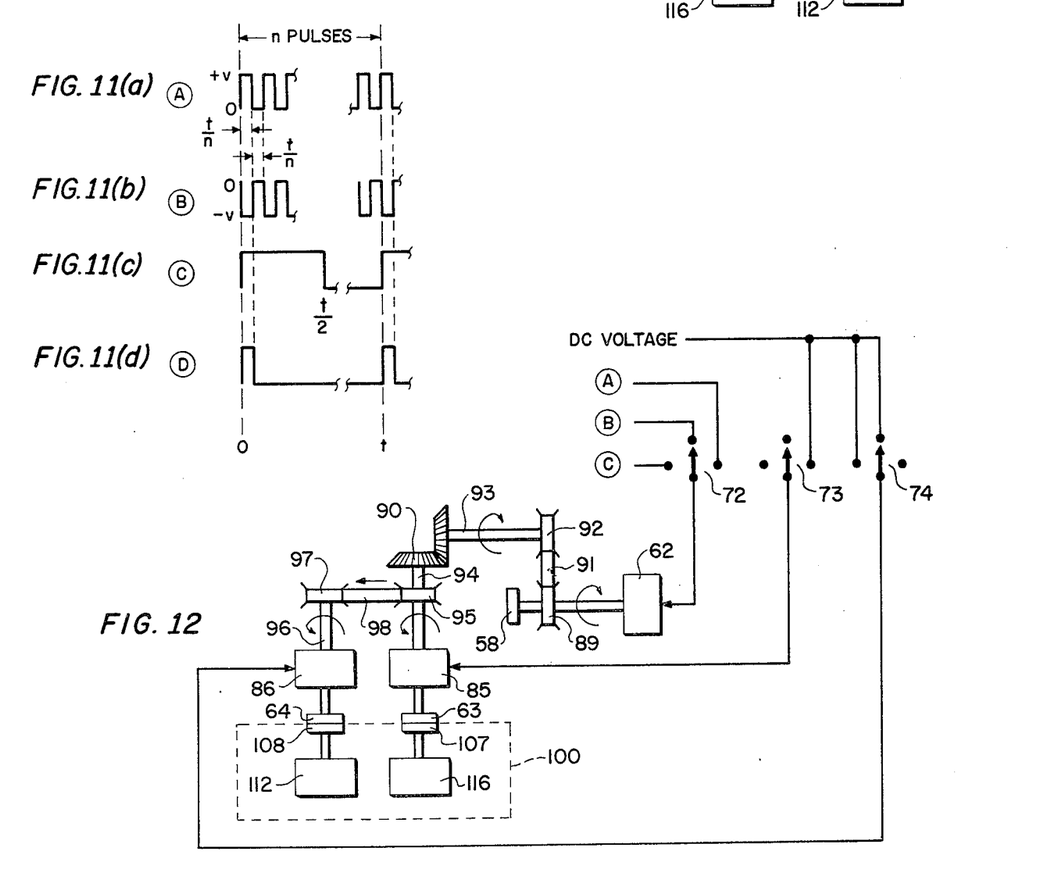
FIG. 12 is a diagram illustrating mechanical details of a modification of the drive system of FIG. 10 wherein some of the drive motors are replaced by electromagnetic clutches.

The diagram of FIG. 10 and the accompanying explanatory waveforms of FIG. 11 illustrate three modes of film drive operation, while FIG. 12 illustrates a modification of the film drive system of FIG. 10. In FIGS. 10 and 12, the elements of the system which correspond to those shown in prior figures are indicated by the same reference numerals. A pulse generator 78 produces a train A of equally spaced pulses (see FIG. 11a) during each time interval $t$. When such a train of pulses is applied to a stepping motor, the latter is driven smoothly and continuously and at a comparatively fast speed, each pulse of duration $(t/n)$ being responsible for one incremental stepwise motion. Because of the symmetry of the pulse waveform, the rotation essentially is continuous in nature. In FIG. 11a the pulses are exemplified as having an amplitude range of 0 to $+v$. By using a polarity reversing circuit 79 in a series with the pulse generator 78, the polarity of the pulses of train A is reversed and a pulse train B (see FIG. 11b) of individual pulse duration $(t/n)$ and amplitude range 0 to $-v$ is obtained. If such a pulse train is applied to a stepping motor, the latter is driven substantially continuously in a direction opposite to that obtained when the motor receives pulse train A.

By supplying the pulses from pulse generator 78 to a counter circuit 80, a symmetrical pulse waveform C (as indicated in FIG. 11c) is provided at the output thereof, which, when applied to a stepping motor, will cause it to rotate continuously in the forward direction at a speed slower than would be obtained were the pulse train A to be applied.

Finally, if the pulse train A from pulse generator 78 is supplied to a counter 81 which provides one narrow pulse during time interval $t$ (the waveform D (see FIG. 11d) is provided. The waveform D, when applied to a stepping motor, will cause it to rotate intermittently, in a manner mentioned previously.

During normal projection the ganged switch arms of all of the wafer switches 71, 72, 73 and 74 are in the left hand position (labeled NORMAL in switch 71). In this position, the motor 61 — used to drive the intermittent drive sprocket wheel 140 — is supplied with pulse waveform D, whereupon sprocket wheel 140 is driven in stepped fashion through a desired angular increment for each time interval $t$. Concurrently, the switches 72 and 74 are in the left hand position, whereupon, the drive motors 62 and 66 are receptive of wave train C; the continuous drive sprocket wheel 145 and take-up hub 112 are driven at normal speed, and, consequently, the film is driven continuously at normal speed past the optical sound system location. A slip clutch 76, which may be of the permanent magnet type, which is always engaged, but subject to slippage, is provided between the take-up drive motor 66 and the clutch plates 64 and 108 associated with take-up hub 112. This slip clutch is needed, as in all film drive systems, to take into account changes in load on motor 66 as the amount of film collected on take-up hub 112 changes during the forward film drive modes. A similar slip clutch 77 is provided between the rewind hub drive motor 65 and the clutch plates 63 and 107 associated with rewind hub 116 to allow slippage as the amount to film accumulated on rewind hub 116 changes during the reverse film drive mode. The clutches 76 and 77 can be keyed directly to the shafts interconnecting the clutch plates 64, 108 and 63, 107 to hubs 112 and 116, all respectively. During normal projection, the drive motor associated with rewind hub 112 is disabled; movement of rewind hub 116 is retarded by virtue of the frictional contact of the juxtaposed clutch plates 62 and 107 and the film is withdrawn from the rewind hub 116 because of rotation of drive motor 61.

When it becomes desirable to move the film rapidly to examine some advanced film frame, the switch arms of all of these switches 71 to 74 are placed in the middle position (indicated as FAST FORWARD on switch 71). In this mode of operation, the pulse train A is applied to all drive motors, except for motor 65, which is disabled. Now, the drive motor 61, which normally is driven intermittently, the drive motor 62 associated with sprocket wheel 145, and the drive motor 66 coupled to take-up hub 112, are driven at relatively high speed until projection of the desired film frame to be examined occurs. At this point, the drive motors 61, 62, and 66 can be disabled by opening a mechanical switch 82 if detailed examination of the frame is desired. The arms of switches 71 to 74 are returned to the NORMAL (left hand) position when normal projection is to be resumed.

When it is desirable to reverse the film rapidly to examine some previously projected frame, reverse rewind of the film onto the rewind hub 116 can be attained by placing the switch arms of switches 71 to 74 in the right hand (FAST REVERSE) position. Now, the drive motors 61, 62 and 65 are energized by the pulse train B, and consequently, the sprocket wheels 140 and 145 and the rewind hub 116 are rotated rapidly in the reverse direction; movement of the take-up hub 116 occurs rapidly in the reverse direction; movement of the take-up hub 112 is retarded by frictional contact of the engaging hub plates 64 and 108. The film thus is rapidly removed from take-up hub 112 and driven through the cassette 100 onto the rewind hub 116. As in the rapid forward mode of operation, the film may be stopped when the proper film frame to be inspected is reached by operating switch 83. The switch 83, of course, is left closed whenever the usual rapid rewind of the entire film onto rewind hub 116 is desired.

In some applications, it may be desirable to eliminate the drive motors 65 and 66 and to use drive motor 62 as a prime mover for the hubs 112 and 116. Such a modification of the system of FIG. 10 is shown in FIG. 12 wherein the motors 65 and 66, in effect, are replaced by electromagnetic clutches 85 and 86. The drive system modification of FIG. 12, of course, represents but one of many possible embodiments.

The shaft of drive motor 62 in addition to carrying the clutch plate 58, also carries a pulley 89. A bevel gear 90 is rotated by means of a belt 91 which engages both pulley 89 and a pulley 92 mounted on the gear shaft 93. The bevel gear 90 translates the rotation of shaft 93 into rotation of shaft 94 about on axis normal to the axis of rotation of shaft 93. Shaft 94 carries a pulley 95 and electromagnetic clutch 85. The electromagnetic clutch 86 is mounted on a shaft 96 which also carries a pulley 97. Rotation of shaft 96 in the same direction as shaft 94 is accomplished be means of a belt 98 which passes around pulleys 95 and 97. The electromagnetic clutch 85 is coupled mechanically to clutch plate 63 which is spring biased against the clutch plate 107 in cassette 100. Similarly, the electromagnetic clutch 86 is coupled mechanically to clutch plate 64 contacting clutch plate 108 in the cassette. When an electrical input (shown in FIG. 12 as a direct current voltage) is supplied to clutch 85, the latter engages and the rotation of shaft 95 (driven from motor 62) is imparted to the rewind hub 116. The same type of electrical input supplied to clutch 86 causes engagement of the latter and the rotation of shaft 96 is imparted to the take-up hub 112. As already pointed out, the drive motor 65 for rewind hub 116 is disabled except during fast reverse operation, during which it is driven in the same manner as motor 62. Consequently, the clutch 85, which replaces motor 65, should be engaged during the fast reverse mode of operation so as to effect rapid reverse rotation of the rewind hub 116 in response to rapid reverse rotation of motor 62. As shown in FIG. 12, de-energization of electromagnetic clutch 85 occurs only when the arm of switch 73 is in the right hand (FAST REVERSE) position. It has also been shown that the drive motor 66 for take-up hub 112 is disabled during the fast reverse mode of operation, but engaged in the same manner as motor 62 during the other two modes of operation. Consequently, clutch 86, which replaces motor 66, should be engaged during the first two modes of operation only, so that clutch 86 effects rotation of the take-up hub 112 in response to either the normal continuous forwarded or fast continuous forward rotation of motor 62. This is accomplished, as shown in FIG. 12, by supplying a direct current voltage to the clutch 86 through switch 74 when the arm thereof is in the normal or fast forward position. On the other hand, the clutch receives no direct current voltage input by way of switch 74 during the FAST REVERSE mode and, hence, is disengaged so that take-up hub is not rotated in response to rotation of motor 62 in the fast reverse mode.

It will be noted that the slip clutches 77 and 78 need not be used in the drive modification of FIG. 12 since the electromagnetic clutches 85 and 86 can serve the same purpose as clutches 77 and 78.

What is claimed is:

1. A film cassette comprising an envelope completely sealed from harmful environmental conditions and containing therein a moveable light-permeable film and two rotatable hubs for receiving said film, said envelope including spaced major members having sealed therein transparent elements forming aligned windows to form an optically transparent film projection gate through which passes a film projection beam emanating from a source external to said envelope, intermittently driven means sealed within said envelope and engaging said film for providing intermittent movement of said film past said film projection gate when engaging corresponding intermittently controlled driving means external to said sealed envelope, said envelope further includes an optically transparent optical sound projection gate for permitting transmission therethrough of an optical sound projection beam emanating from a source external to said envelope, continuously driven means sealed within said envelope and engaging said film for providing continuous movement of said film past said optical sound projection gate when engaging corresponding continuously driven means external to said sealed envelope.

2. A sealed film cassette according to claim 1 wherein said driven means are rotary.

3. A sealed film cassette according to claim 1 including means within said cassette for twisting the plane of the film as reeled onto said hubs into a film projection plane at said projection gates which is normal to said film projection beam.

* * * * *